United States Patent
Stroia et al.

(10) Patent No.: US 8,359,837 B2
(45) Date of Patent: Jan. 29, 2013

(54) TEMPERATURE DETERMINATION AND CONTROL OF EXHAUST AFTERTREATMENT SYSTEM ADSORBERS

(75) Inventors: Bradlee J. Stroia, Columbus, IN (US); Sam Geckler, Columbus, IN (US); Michael Cunningham, Greenwood, IN (US)

(73) Assignee: Cummins Inc., Columbus, IN (US)

( * ) Notice: Subject to any disclaimer, the term of this patent is extended or adjusted under 35 U.S.C. 154(b) by 1183 days.

(21) Appl. No.: 12/002,779

(22) Filed: Dec. 18, 2007

(65) Prior Publication Data

US 2008/0282675 A1 Nov. 20, 2008

Related U.S. Application Data

(60) Provisional application No. 60/876,778, filed on Dec. 22, 2006.

(51) Int. Cl.
*F01N 3/00* (2006.01)

(52) U.S. Cl. .......... 60/295; 60/274; 60/276; 60/285; 60/297; 60/311

(58) Field of Classification Search .......... 60/274, 60/276, 285, 295, 301, 297, 311
See application file for complete search history.

(56) References Cited

U.S. PATENT DOCUMENTS

| | | | |
|---|---|---|---|
| 5,584,177 A | 12/1996 | Oketani et al. | |
| 6,341,487 B1 | 1/2002 | Takahashi et al. | |
| 6,370,870 B1 | 4/2002 | Kamijo et al. | |
| 6,378,298 B2* | 4/2002 | Harima et al. | 60/288 |
| 6,446,430 B1 | 9/2002 | Roth et al. | |
| 6,502,391 B1 | 1/2003 | Hirota et al. | |
| 6,562,753 B2 | 5/2003 | Miyoshi et al. | |
| 6,571,602 B2* | 6/2003 | Ohkuma | 73/23.32 |
| 6,796,118 B2* | 9/2004 | Kitahara | 60/285 |
| 6,863,058 B2 | 3/2005 | Kurtz et al. | |
| 6,988,361 B2* | 1/2006 | van Nieuwstadt et al. | 60/295 |
| 7,054,734 B2 | 5/2006 | Todoroki et al. | |
| 7,159,568 B1 | 1/2007 | Lewis et al. | |
| 7,178,327 B2 | 2/2007 | Miyashita | |
| 7,886,524 B2* | 2/2011 | van Nieuwstadt et al. | 60/285 |
| 2005/0045163 A1 | 3/2005 | Kurtz et al. | |
| 2005/0120709 A1 | 6/2005 | Ichise et al. | |
| 2005/0228572 A1 | 10/2005 | Mansbart | |
| 2006/0016180 A1 | 1/2006 | Tomita et al. | |
| 2006/0260299 A1 | 11/2006 | Wang et al. | |

FOREIGN PATENT DOCUMENTS

| | | |
|---|---|---|
| EP | 1515033 A2 | 3/2005 |
| EP | 1035315 B1 | 8/2006 |
| EP | 1536121 B1 | 1/2007 |
| WO | WO 2005/088108 A1 | 9/2005 |

* cited by examiner

*Primary Examiner* — Thomas Denion
*Assistant Examiner* — Diem Tran
(74) *Attorney, Agent, or Firm* — Krieg DeVault LLP (57) ABSTRACT

One embodiment is a unique method including determining a temperature of a NOx adsorber. Further embodiments, forms, objects, features, advantages, aspects, and benefits shall become apparent from the following description and drawings.

28 Claims, 9 Drawing Sheets

TEMPERATURE DETERMINATION AND CONTROL OF EXHAUST AFTERTREATMENT SYSTEM ADSORBERS

PRIORITY

The benefits and rights of priority of U.S. patent application 60/876,778 filed Dec. 22, 2006 are claimed and that application is incorporated by reference.

BACKGROUND

Internal combustion engines such as diesel engines produce a number of combustion products including particulates, hydrocarbons ("HC"), carbon monoxide ("CO"), oxides of nitrogen ("NOx"), oxides of sulfur ("SOx"), and others. Diesel engines may by required to reduce or eliminate emission of these and other products of combustion, for example, by using one or more adsorbers, traps, catalytic components, and/or other components. When a component reaches a certain storage capacity it may be beneficial to perform regeneration. Regeneration to eliminate stored nitrogenous or nitrogen-containing compounds (NOx) is termed deNOx. Regeneration to eliminate stored sulfurous or sulfur-containing compounds (SOx) is termed deSOx. Regeneration to eliminate trapped particulates is termed deSoot. Regeneration activities are generally those through which a functionality of an exhaust aftertreatment component is restored or improved. Regeneration may require control of a variety of different operating conditions, for example, temperature, fueling, fresh air flow, and others. Unless adequate controls are provided, inefficient regenerations or regeneration failures may result.

SUMMARY

One embodiment is a unique method including determining a temperature of a NOx adsorber. Further embodiments, forms, objects, features, advantages, aspects, and benefits shall become apparent from the following description and drawings.

DETAILED DESCRIPTION

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated embodiments, and such further applications of the principles of the invention as illustrated therein being contemplated as would normally occur to one skilled in the art to which the invention relates.

Figure 1:
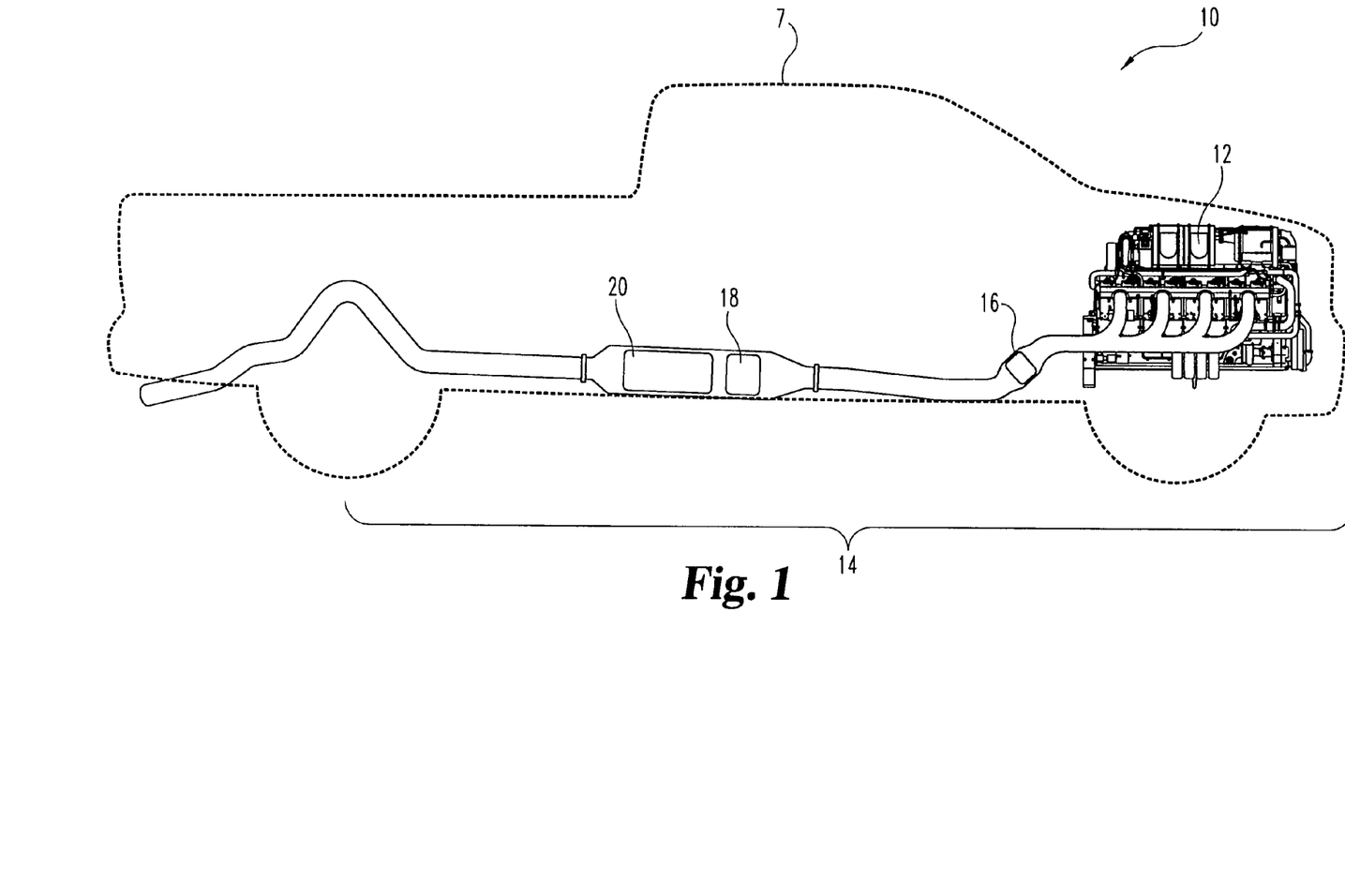
FIG. 1 is a schematic of an integrated engine-exhaust aftertreatment system provided in a vehicle.

With reference to FIG. 1, there is illustrated a schematic of a preferred integrated engine-exhaust aftertreatment system 10 provided in a vehicle 7. The aftertreatment subsystem 14 includes a diesel oxidation catalyst 16 which is preferably a close coupled catalyst but could be other types of catalyst units such as a semi-close coupled catalyst, a NOx adsorber or lean NOx trap 18, and a diesel particulate filter 20 which are coupled in flow series to receive and treat exhaust output from engine 12.

The diesel oxidation catalyst unit 16 is preferably a flow through device that includes a honey-comb like substrate. The substrate has a surface area that includes a catalyst. As exhaust gas from the engine 12 traverses the catalyst, CO, gaseous HC and liquid HC (unburned fuel and oil) are oxidized. As a result, these pollutants are converted to carbon dioxide and water. During operation, the diesel oxidation catalyst unit 16 is heated to a desired temperature.

The NOx adsorber 18 is operable to adsorb NOx and SOx emitted from engine 12 to reduce their emission into the atmosphere. The NOx adsorber 18 preferably includes catalyst sites which catalyze oxidation reactions and storage sites which store compounds. After NOx adsorber 18 reaches a certain storage capacity it is regenerated through deNOx and/or deSOx processes. Other embodiments contemplate use of different NOx aftertreatment devices, for example, a converter such as a saline NOx catalyst.

The diesel particulate filter or soot filter 20 is preferably a catalyzed soot filter, but may be one or more of several additional or alternate filters. The diesel particulate filter 20 is utilized to capture unwanted diesel particulate matter from the flow of exhaust gas exiting the engine 12. Diesel particulate matter includes sub-micron size particles found in diesel exhaust, and both solid and liquid particles, and may be classified into several fractions including: inorganic carbon (soot), organic fraction (often referred to as SOF or VOF), and sulfate fraction (hydrated sulfuric acid). The regeneration of diesel particulate filter 20 is referred to as deSoot or soot regeneration and may include oxidation of some or all of the trapped fractions of diesel particulate matter. The diesel particulate filter 20 preferably includes at least one catalyst to catalyze the oxidation of trapped particulate.

Figure 2:
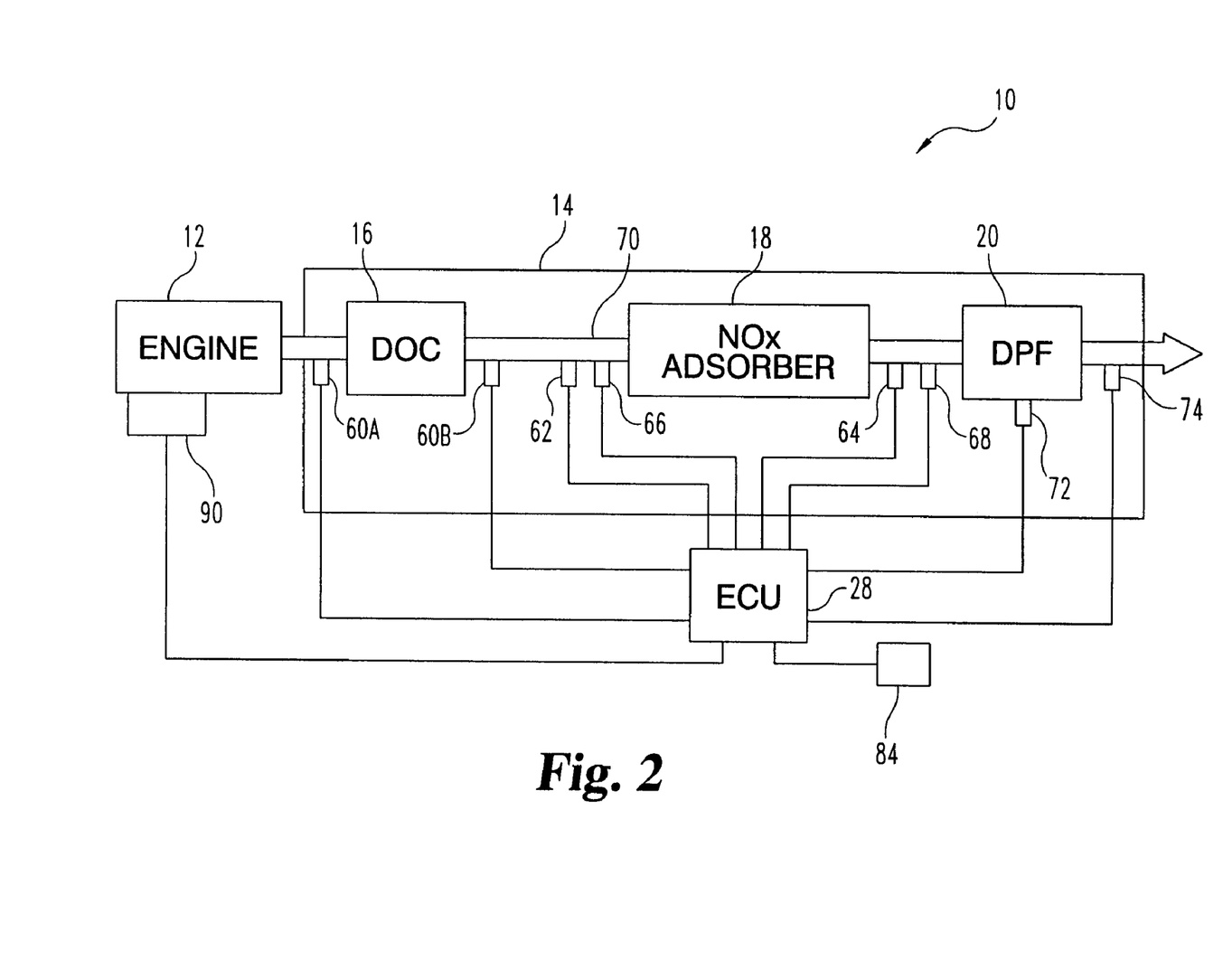
FIG. 2 is a schematic of an integrated engine-exhaust aftertreatment system operatively coupled with an engine control unit.

With reference to FIG. 2, there is illustrated a schematic of integrated engine-exhaust aftertreatment system 10 operatively coupled with an engine control unit ("ECU") 28. At first temperature sensor 60A is connected with the diesel oxidation catalyst unit 16 for measuring the temperature of the exhaust gas as it enters the diesel oxidation catalyst unit 16. A second temperature sensor 60B measures temperature at the entrance or upstream from the diesel oxidation catalyst unit 16 and another at the exit or downstream from the diesel oxidation catalyst unit 16. Information from temperature sensors 60A and/or 60B is provided to ECU 28 and used to calculate the temperature of the diesel oxidation catalyst unit 16. Additional temper sensor arrangements are contemplated including those having greater or fewer numbers of sensors, sensors positioned in different locations, virtual sensors, physical sensors and combinations of the foregoing and/or other alternatives.

A first NOx adsorber temperature sensor 62 senses the temperature of flow entering or upstream of NOx adsorber 18 and provides a signal to ECU 28. A second NOx temperature sensor 64 senses the temperature of flow exiting or downstream of NOx adsorber 18 and provides a signal to ECU 28. NOx temperature sensors 62 and 64 are used to monitor the temperature of the flow of gas entering and exiting the NOx adsorber 18 and provide signals that are indicative of the temperature of the flow of exhaust gas to the ECU 28. An algorithm may then be used by the ECU 28 to determine the operating temperature of the NOx adsorber 18. Additional temper sensor arrangements are contemplated including those having greater or fewer numbers of sensors, sensors positioned in different locations, virtual sensors, physical sensors and combinations of the foregoing and/or other alternatives.

A first oxygen sensor 66 is positioned in fluid communication with the flow of exhaust gas entering or upstream from the NOx adsorber 18 and a second oxygen sensor 68 is positioned in fluid communication with the flow of exhaust gas exiting or downstream of the NOx adsorber 18. Oxygen sensors are preferably universal exhaust gas oxygen sensors or lambda sensors, but could be any type of oxygen sensor. The oxygen sensors 66 and 68 are connected with the ECU 28 and generate electric signals that are indicative of the amount of oxygen contained in the flow of exhaust gas. The oxygen sensors 66 and 68 allow the ECU 28 to accurately monitor air-fuel ratios ("AFR") also over a wide range thereby allowing the ECU 28 to determine a lambda value associated with the exhaust gas entering and exiting the NOx adsorber 18.

Engine 12 includes a fuel injection system 90 that is operatively coupled to, and controlled by, the ECU 28. Fuel injection system 90 delivers fuel to the cylinders of the engine 12. Various types of fuel injection systems may be utilized in the present invention, including, but not limited to, pump-line-nozzle injection systems, unit injector and unit pump systems, high pressure common rail fuel injection systems, common rail fuel injection systems and others. The timing of the fuel injection, the amount of fuel injected, the number and timing of injection pulses, are preferably controlled by fuel injection system 90 and/or ECU 28. An example of fuel injection parameters for one mode of operation is described below in connection with in FIG. 9.

Sensor 72 is operatively coupled with diesel particulate filter 20. Sensor 72 is a pressure differential sensor which is operable to sense a pressure differential across diesel particulate filter 20 and provide pressure differential signal information to ECU 28. Sensor 74 is a temperature sensor which is operable to sense a temperature at the outlet of diesel particulate filter 20 or downstream from diesel particulate filter 20 and provide temperature signal information to ECU 28. ECU 28 can also receive temperature information from bed model virtual sensor 80. ECU 28 can receive information about ambient or barometric pressure from sensor 80. ECU 28 can receive information about fuel flow rate from fuel flow rate virtual sensor 82. ECU 28 can receive information about fresh air flow rate from fresh air flow sensor 84, which can be a mass flow rate sensor which is operatively coupled with a fresh air flow passage. Other sensor arrangements are also contemplated.

Figure 3:
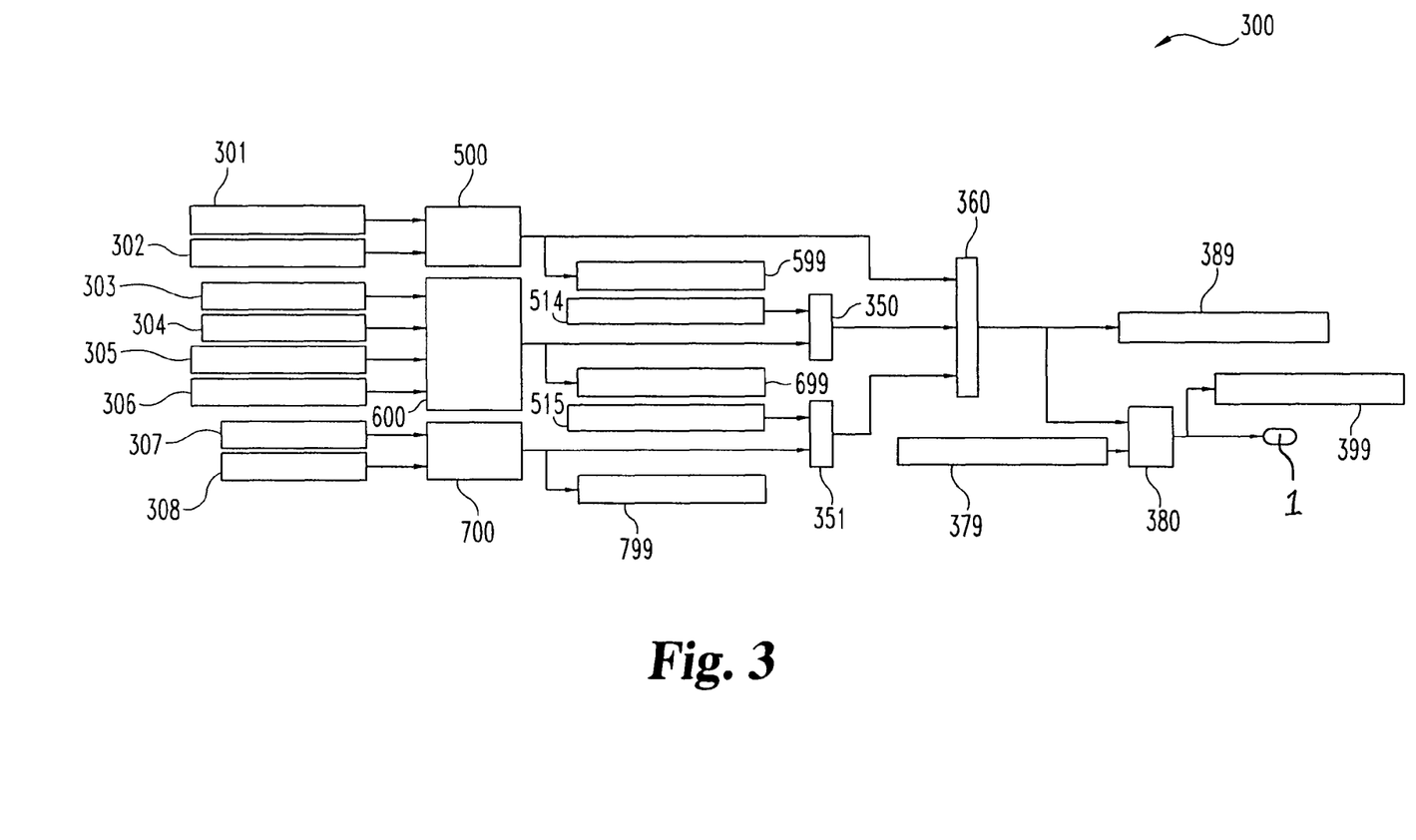
FIG. 3 is a NOx adsorber bed temperature control diagram.

With reference to FIG. 3, there is illustrated a diagram of a preferred NOx adsorber bed temperature control 300. NOx adsorber bed temperature control 300 receives variables 301, 302, 303, 304, 305, 306, 307, and 308 as inputs. Variable 301 is NOx adsorber inlet temperature value which can be determined from a temperature sensor at the inlet to a NOx adsorber. Variable 302 is NOx adsorber outlet temperature value which can be determined from a temperature sensor at the outlet to a NOx adsorber. Variable 303 is injected aux2 fuel which in one mode of operation is the fuel injection pulse 940 illustrated and described in connection with FIG. 9. Variable 304 is injected aux3 fuel which in one mode of operation corresponds to the fuel provided by injection pulse 950 illustrated and described in connection with FIG. 9. Variable 305 is fresh air flow which can be determined from a fresh air flow sensor. Variable 306 is engine speed which can be determined from an engine speed sensor and is preferably filtered and further processed by an ECU. Variable 307 is a lambda value of the outlet of a NOx adsorber which can be determined from an oxygen sensor at the outlet of a NOx adsorber. Variable 308 is a lambda value of the inlet of a NOx adsorber which can be determined from an oxygen sensor at the inlet of a NOx adsorber.

Variables 301 and 302 are provided to block 500 which is described in further detail below in connection with FIG. 5. Variables 303, 304, 305, and 306 are provided to block 600 which is described in further detail below in connection with FIG. 6. Variables 307 and 308 are provided to block 700 which is described in further detail below in connection with FIG. 7. Block 500 outputs an alternate NOx adsorber bed temperature reference value to variable 599 and to operator 360. Block 600 outputs an alternate NOx adsorber bed temperature aux value to variable 699 and to operator 350. Scaling variable 514 is also input to operator 350 which multiplies variable 514 and variable 699 and outputs to operator 360. Block 700 outputs an alternate NOx adsorber bed temperature rich value to variable 799 and to operator 351. Scaling variable 515 is also input to operator 351 which multiplies variable 515 and variable 799 and outputs to operator 360. Operator 360 sums the values received at its inputs and outputs to variable 389 and operator 380. Variable 389 is the unfiltered alternate NOx adsorber temperature value. Operator 380 is a filter that also receives variable 380 which is a filter constant and outputs to variable 399 the alternate NOx adsorber bed temperature value.

Figure 4:
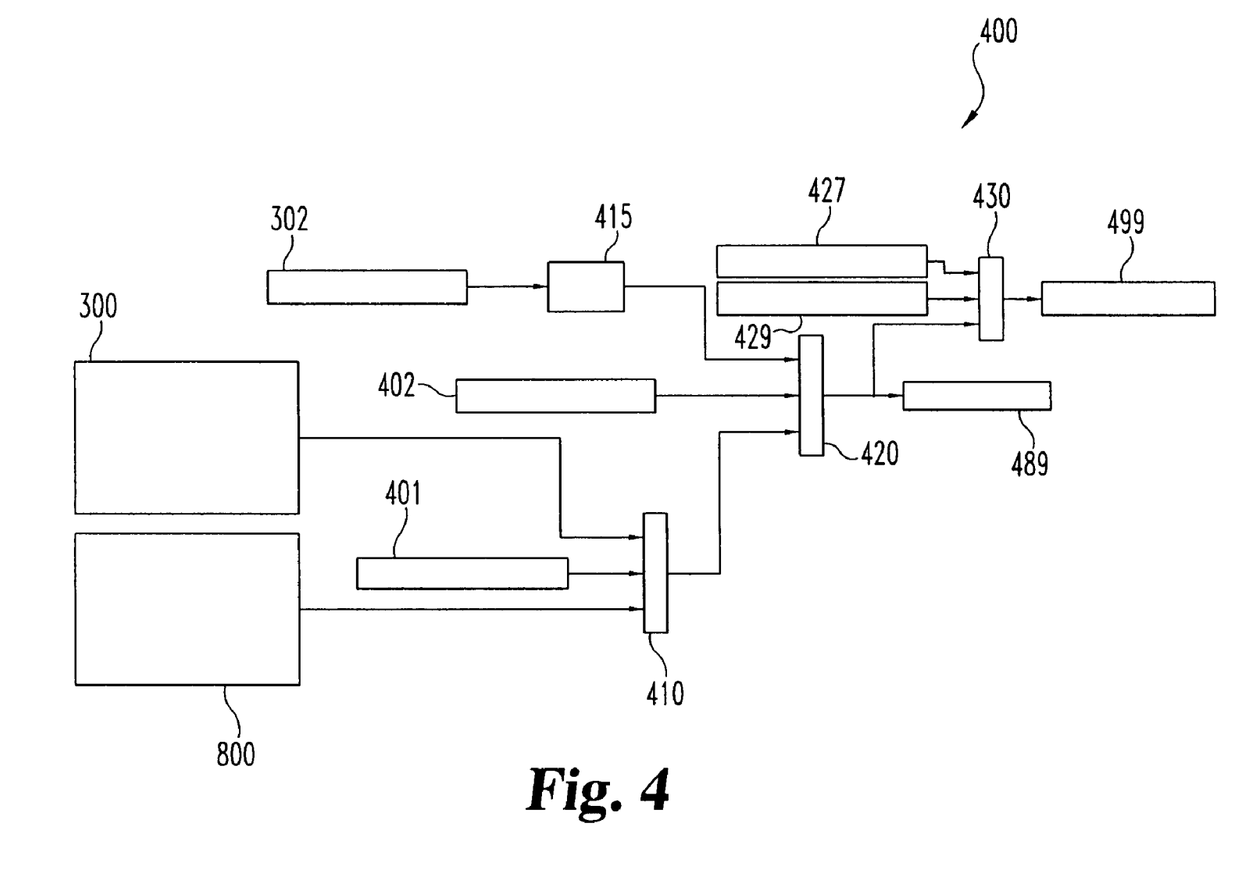
FIG. 4 is a NOx adsorber bed temperature control diagram.
Figure 8:
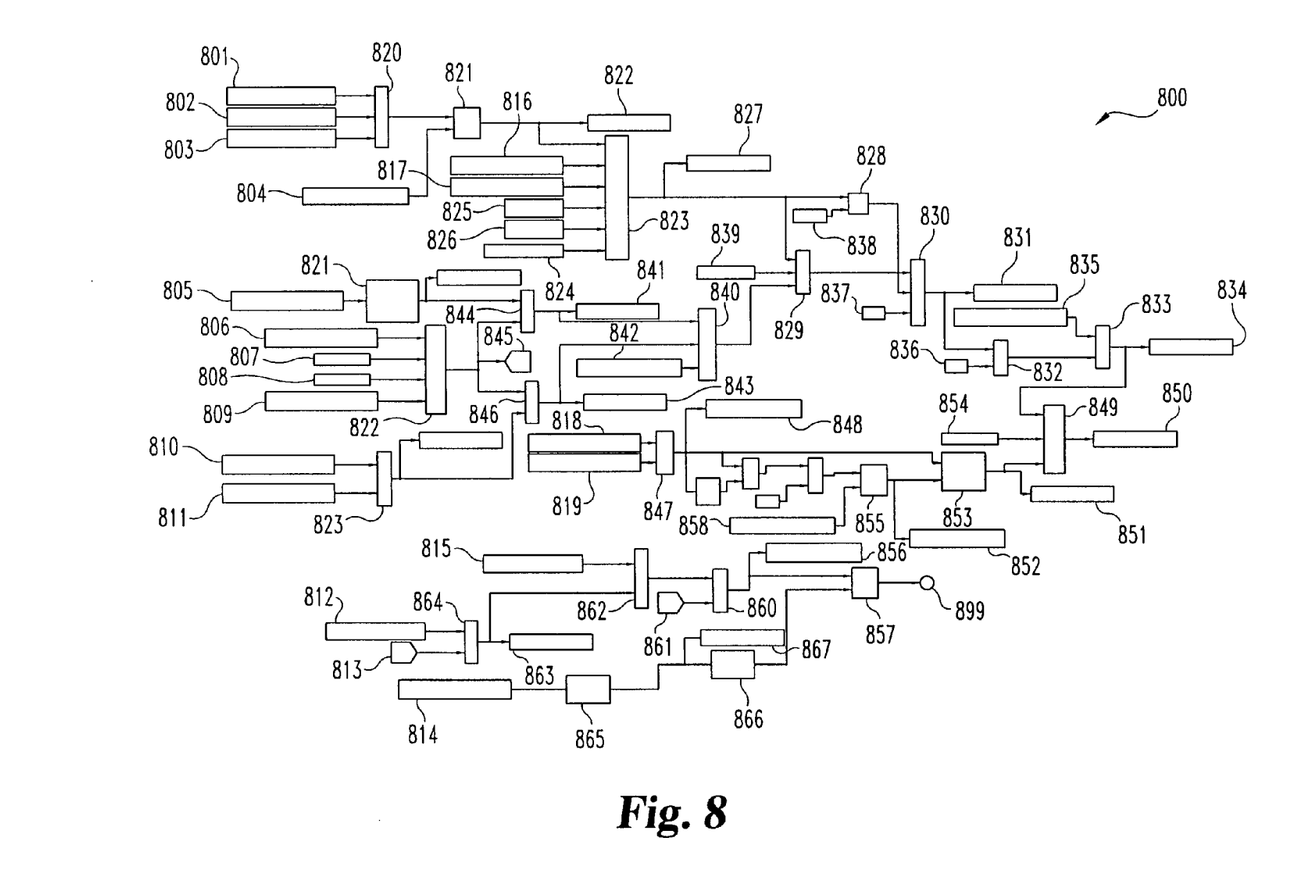
FIG. 8 is a diagram of block 800 of FIG. 4.

With reference to FIG. 4, there is illustrated a diagram of a preferred NOx adsorber bed temperature estimator 400. Block 300, the alternate NOx adsorber bed temperature model which was described above in connection with FIG. 3, and block 800, the NOx adsorber bed temperature model which is described below in connection with FIG. 8, are provided to the top and bottom inputs of switch 410, respectively. Alternate NOx adsorber temperature model enable variable 401 is provided to the switch input of switch 410 which outputs its top input when it receives a true value at its switch input and its bottom input when it receives a false value at its switch input. Switch 410 outputs to the bottom input of switch 420. NOx bed sensor enable variable 402 is provided to the switch input of switch 420. NOx adsorber outlet temperature value variable 302 is input to lookup table 415 which outputs a NOx adsorber bed temperature based upon the input value it receives.

The output of lookup table 415 is provided to the top input of switch 420 which outputs its top input when it receives a true value at its switch input and its bottom input when it receives a false value at its switch input. Switch 420 outputs to variable 489 which is a first NOx adsorber bed temperature value and to the bottom input of switch 430. NOx bed user value variable 427 is provided to the top input of switch 430 and NOx bed user enable variable 428 is provided to the switch input of switch 430 which outputs its top input when it receives a true value at its switch input and its bottom input when it receives a false value at its switch input. The output of switch 430 is provided to variable 499 which is a second NOx adsorber bed temperature value.

Figure 5:
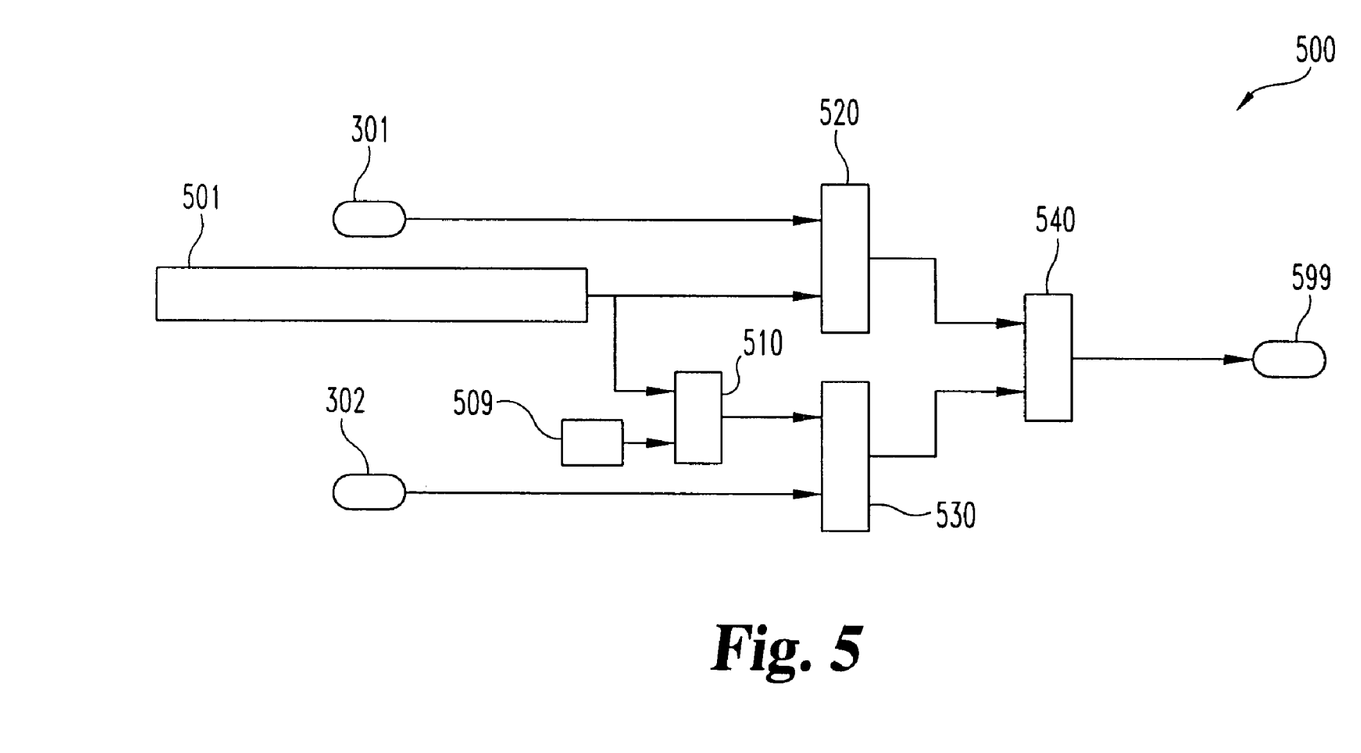
FIG. 5 is a diagram of block 500 of FIG. 3.

With reference to FIG. 5, there is illustrated a diagram of block 500 of FIG. 3. Block 500 receives variables 301 and 302 which were described above. Block 500 also receives variable 501 which is the alternate NOx adsorber bed temperature T1 basis. Variable 301 and variable 501 are input to operator 520 which multiplies its inputs and outputs to operator 540. Variable 510 and variable 509 (which is a constant set=1 in the illustrated embodiment) are input to operator 510 which subtracts variable 509 from variable 501 and outputs to operator 530. Variable 302 is also provided to variable 530 which multiplies its inputs and outputs to operator 540. Operator 540 sums its inputs and outputs to variable 599.

Figure 6:
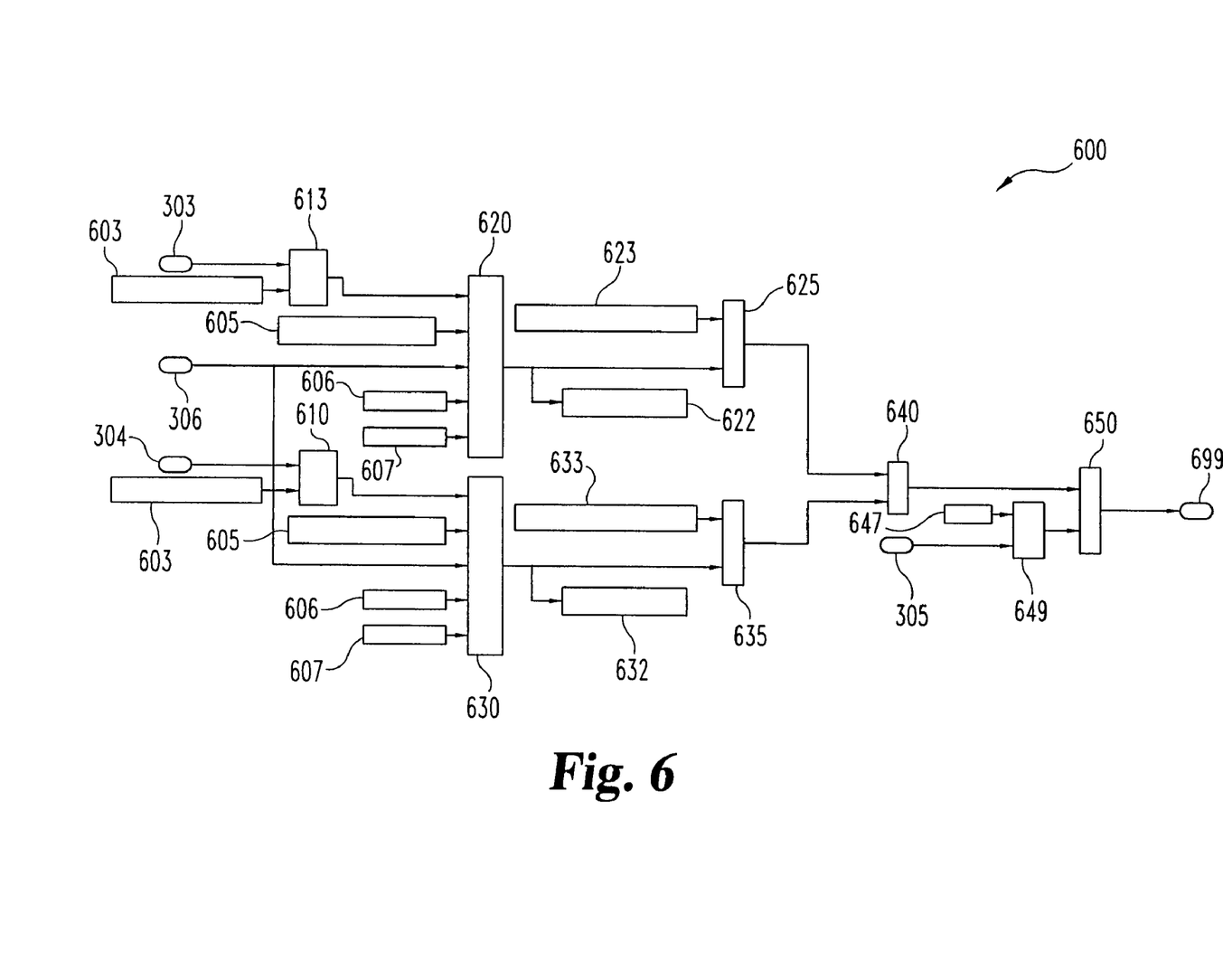
FIG. 6 is a diagram of block 600 of FIG. 3.

With reference to FIG. 6, there is illustrated a diagram of block 600 of FIG. 3. Block 600 receives variables 303, 304 and 305 which were described above. Block 600 also receives variables 603 which is a filter constant, variable 605 which is a number of cylinders value, variable 606 which is set to a constant value of 17793 in the illustrated embodiment, variable 607 which is set to a constant value of 60 in the illustrated embodiment in order to convert between hours and minutes, variable 623 which is an alternate NOx bed temperature aux2 scaling value, and variable 633 which is a an alternate NOx bed temperature aux3 scaling value.

Variables 303 and 603 are input to filter 613 which filters variable 303 and outputs to operator 620. Variables 304 and 603 are input to filter 610 which filters variable 304 and outputs to operator 630. Variable 605, 606 and 607 are input to operators 620 and to operator 630. Operator 610 multiplies the output of filter 613 by variable 605 and variable 306, divides the result by variable 606 and variable 607, and outputs to variable 622 which is an aux2 fuel rate and operator 625. Operator 620 multiplies the output of filter 610 by variable 605 and variable 306, divides the result by variable 606 and variable 607, and outputs to variable 632 which is an aux3 fuel rate and operator 635. Operator 625 multiplies variable 622 and variable 623 and outputs to operator 640. Operator 635 multiplies variable 632 and variable 6323 and outputs to operator 640. Operator 640 sums its inputs and outputs to operator 640.

Variable 305 is input to operator 649 as is variable 647 which is set to a constant of 0.5 in the illustrated embodiment. Operator 640 takes the maximum of its inputs and outputs to operator 650. Operator 650 divides the output of operator 640 by the output of operator 649 and outputs to variable 699, the alternate NOx bed temperature Saux value.

Figure 7:
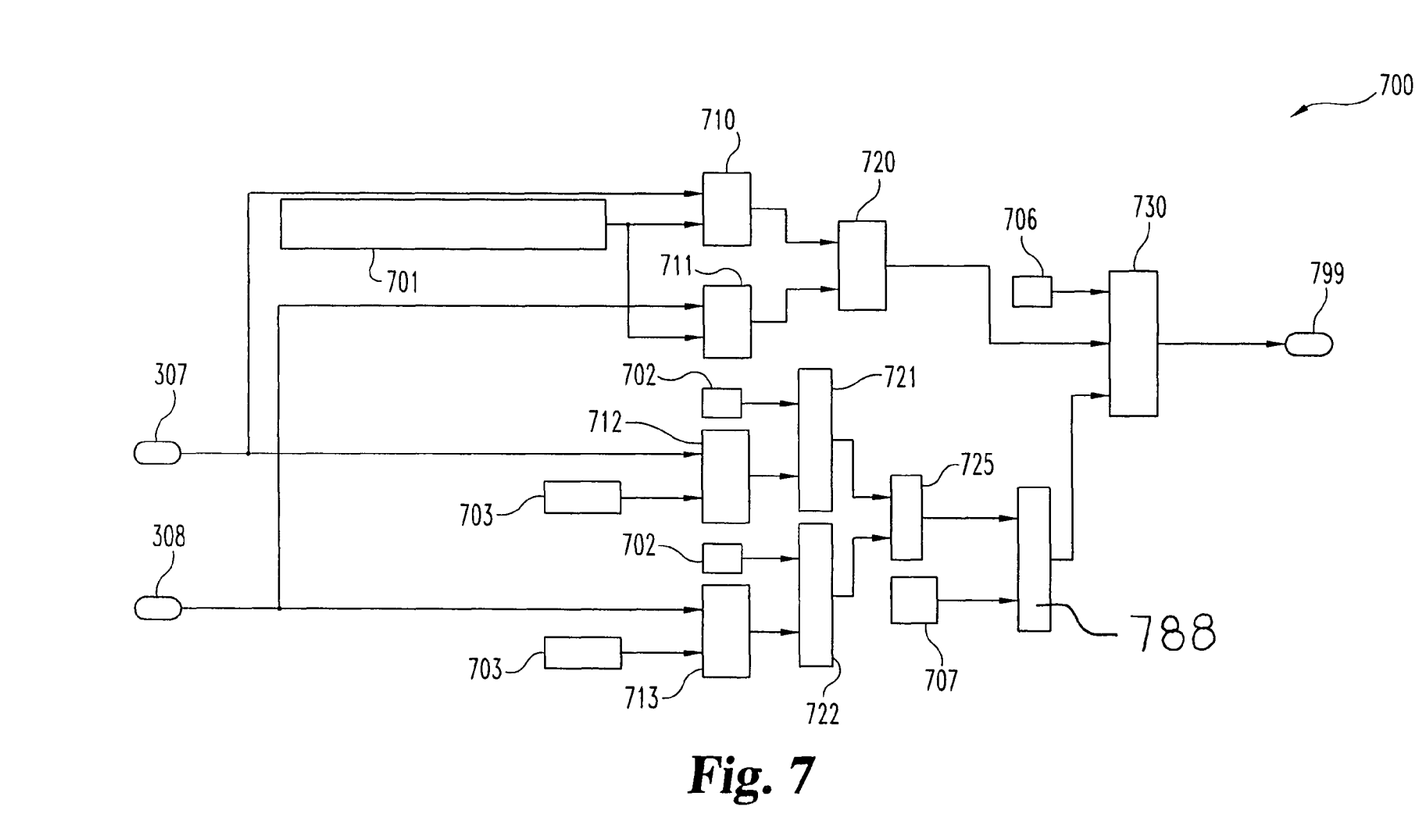
FIG. 7 is a diagram of block 700 of FIG. 3.

With reference to FIG. 7, there is illustrated a diagram of block 700 of FIG. 3. Block 700 receives variables 307 and 307 which were described above. Block 700 also receives variables 701 which is the alternate NOx bed temperature lambda threshold, variable 702 which is set as a constant=1 in the illustrated embodiment, and variable 703 which provides divide by zero protection. Variable 307 is provided to operators 710 and 712. Variable 308 is provided to operators 711 and 713. Variable 701 is provided to operators 710 and 711. Constant 703 is provided to operators 712 and 713. Constant 702 is provided to operators 721 and 722.

Operator 710 evaluates whether variable 307>=variable 701 and outputs to operator 720. Operator 711 evaluates whether variable 308>=variable 701 and outputs to operator 720. Operator 720 is a Boolean OR operator which outputs to the switch input of switch 730. Operator 712 outputs the maximum of its inputs to operator 721. Operator 713 outputs the maximum of its inputs to operator 722. Operator 721 divides its top input by its bottom input and outputs to operator 725. Operator 722 divides its top input by its bottom input and outputs to operator 725. Operator 725 subtracts its bottom input from its top input and outputs to operator 729. Operator 729 outputs to the bottom input of switch 730. Constant 706 which is set equal to zero in the illustrated embodiment is provided to the top input of switch 730. Switch 730 outputs its top input when the value provided to its switch input is true and outputs its bottom input when the value provided to its switch input is false. Switch 730 outputs to variable 799.

With reference to FIG. 8, there is illustrated a diagram of block 800 of FIG. 4. Catalyst Fuel variable 801, Injected_Aux2_Fuel variable 802, and Injected_Aux3_Fuel variable 803 are input to operator 820 which sums its inputs and outputs to filter 821. Filter constant 804 is also provided to filter 821 which filters the input it receives from operator 820 and outputs to variable 822 and to operator 823. Number of cylinders variable 816 filtered engine speed variable 817, constant 826 which converts between hours and seconds, constant 826 which converts between kilograms and pounds, and constant 825 are also input to operator 823. Operator 823 multiplies variables 822, 816, 817, and constant 826 and divides by constants 824 and 825, and provides its output to variable 827, operator 828 and operator 829. Operator 828 tests whether variable 827>constant 838 and outputs to the switch input of switch 830.

Turbine outlet temperature value variable 805 is input to Fahrenheit to Kelvin converter which outputs to variable 888 and to operator 844. Fresh air flow variable 806, pounds to kilograms conversion constant 807, minutes to second conversion constant 808, and variable 809 are input to operator 822. Operator 822 multiplies variable 806, constant 807 and variable 808, divides by constant 808, and outputs to operators 844, flag 845 and operator 846. Operator 844 multiplies its inputs and outputs to variable 841 and operator 840. NOx adsorber input temperature variable 810 and ccc offset variable 811 are provided to operator 823 which sums its inputs and outputs to variable 877 and operator 846. Operator 846 outputs to variable 843 and operator 840. Variable 842 is also provided to operator 840.

Operator 840 adds its bottom two inputs and subtracts its top input and outputs to operator 829. Constant 839 is also provided to operator 829. Operator 829 divides by its top two inputs, multiplies by its bottom input, and outputs to the top input of switch 830. Constant 837 is provided to the bottom input of switch 830. Switch 830 outputs to variable 831 and operator 832. Constant 836 is also provided to operator 832. Operator 832 subtracts its top input from its bottom input and outputs to operator 833. Variable 853 is also provided to operator 833 which multiplies its inputs and outputs to variable 834.

NOx adsorber outlet temperature variable 818 and NOx adsorber inlet temperature variable 819 are provided to operator 847 which subtracts its bottom input from its top input and outputs to variable 848 and operators 886, 885 and lookup table 853. Operators 886, 885, 883 and 884 perform debounce and output to filter 855 which also receives filter constant 858. Filter 855 outputs to lookup table 853 and variable 852. Lookup table 853 outputs to variable 851 and operator 849. Operator 849 multiplies its inputs and outputs to variable 850.

NOx adsorber inlet temperature variable 813 and variable 814 are input to operator 864 which multiplies its inputs and outputs to variable 863 and operator 862. Variable 815 is also provided to operator 862 which sums its inputs and outputs to operator 860. Variable 861 is also provided to operator 860 which divides its top input by its bottom input and outputs to variable 859 and filter 857. Variable 814 inputs to lookup table 865 which outputs to lookup table 866 and variable 867. Lookup table 866 outputs to filter 857. Filter 857 outputs to variable 899, which can be provided to the output of block 400 as illustrated above in connection with FIG. 4.

Figure 9:
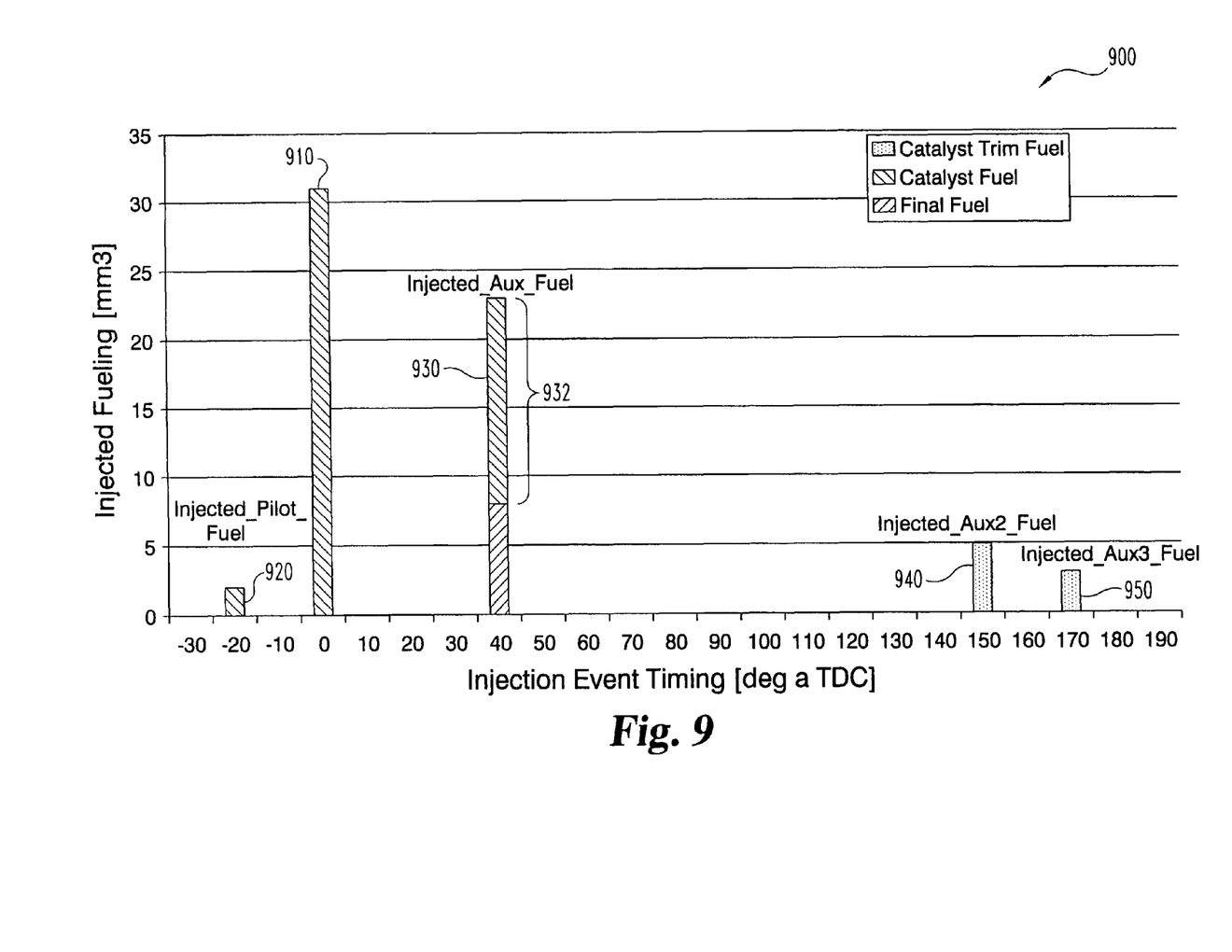
FIG. 9 is a graph of fuel injection events.

With reference to FIG. 9, there is illustrated a graph of fuel injection events 900 according to a preferred deSoot regeneration mode. The X-axis of each of graph 900 is piston position expressed in units of degrees after top dead center ("deg aTDC"). Thus, for example, an X-axis value of 0 (zero) indicates that piston position is at top dead center, an X-axis value of −10 indicates that piston position is 10 degrees before top dead center, and an X-axis value of 10 indicates that piston position is 10 degrees after top dead center. The Y-axis of each of the graph 900 injected fueling volume in units of cubic millimeters (mm³). The bars in each graph indicate injection pulses the timing of which is indicated by their X-axis position and the volume of which is indicated by of their Y-axis length. The legend in each of the illustrated graphs is a key which correlates the variables Catalyst Trim Fuel, Catalyst Fuel, and Final Fuel to the shaded portions of the injection pulses. Additionally, the following terms relate to FIG. 9:

Cylinder_Fueling: The ultimate total fuel going into the cylinder. This variable is the summed quantity of all injections.

Final Fuel: The fueling that comes out of the throttle position versus fueling table.

Injected_Aux_Fuel: The total amount of fuel going in the injection event at the Aux_SOI timing. This variable includes feedforward fueling pulled out of the main injection and part or all of Catalyst Fuel.

Injected_Aux2_Fuel: The total amount of fuel going in the injection event at the Aux2_SOI timing. This variable includes feedforward fueling pulled out of the main injection and part or all of Catalyst Fuel, and part or all of Catalyst Trim Fuel.

Injected_Aux3_Fuel: The total amount of fuel going in the injection event at the Aux3_SOI timing. This variable includes part or all of Catalyst Trim Fuel.

Catalyst Fuel: Extra amount of fuel for a regeneration event. This quantity can be split and put into the Aux and Aux2 injection events. This variable is included in Cylinder_Fueling, but not Final Fuel.

Catalyst Trim Fuel: Extra amount of fuel for a regeneration event. This variable is often closed loop feedback fuel, but can be feedforward from Regen tables. This variable can be split between Aux2 and Aux3 injection events. This variable is included in Cylinder_Fueling, but not Final Fuel.

Injected_Pilot_Fuel: Fuel provided to a pre main injection pulse. This variable is included in Cylinder_Fueling and in Final Fuel.

The fuel injection events include main injection pulse 910, pilot injection pulse 920, post injection pulse 930, second post injection pulse 940, and third post injection pulse 950. The Catalyst Fuel variable provides additional fuel at post injection pulse 930 as indicated by bracket 932. This provides extra exhaust heat to combust soot in a soot filter such as a diesel particulate filter. The fuel provided by the Catalyst Trim Fuel variable is shared by second post injection pulse 940, and third post injection pulse 950. The second and third post injection pulses provide temperature control during deSoot regeneration. The quantity and timing of each of the fuel injection pulses provides transparency to the operator between the preferred base mode and the preferred deSoot regeneration mode.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred, more preferred, or exemplary utilized in the description above indicate that the feature so described may be more desirable or characteristic, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary. There is no desire to limit an claim to a particular embodiment, mode, characteristic, criteria of the foregoing embodiments other than as recited by the following claims.

The invention claimed is:

1. A method comprising:
receiving information of a first temperature sensor, a second temperature sensor, a first oxygen sensor, and a second oxygen sensor; and
calculating a temperature of a NOx adsorber based upon the information of the first temperature sensor, the second temperature sensor, the first oxygen sensor, and the second oxygen sensor according to a first set of operations or according to a second set of operations;
wherein the calculating is further based upon a catalyst trim fuel value.

2. A method according to claim 1 wherein the first temperature sensor is an adsorber inlet temperature sensor, the second temperature sensor is an adsorber outlet temperature sensor, the first oxygen sensor is an adsorber inlet oxygen sensor, and the second oxygen sensor is an adsorber outlet oxygen sensor.

3. A method according to claim 1 further comprising receiving engine speed information; wherein the calculating is further based upon the engine speed information.

4. A method according to claim 1 further comprising receiving fresh air flow information; wherein the calculating is further based upon the fresh air flow information.

5. A method according to claim 1 wherein the catalyst trim fuel value includes information of two or more fuel injection pulses.

6. A method according to claim 1 wherein the catalyst trim fuel value includes a pulse at greater than about 90 degrees after top dead center.

7. A method according to claim 1 wherein the catalyst trim fuel value includes a first pulse and a second pulse, the first pulse being greater than about 60 degrees after top dead center, the second pulse being greater than the first pulse.

8. A method according to claim 6 including a main injection pulse, a pilot injection pulse, a first post injection pulse, a second post injection pulse, and a third post injection pulse.

9. A method according to claim 1 further comprising initiating adsorber regeneration based upon the calculating; wherein the regeneration is accomplished using in cylinder fueling commands.

10. A system comprising:
a processor;
a diesel exhaust aftertreatment subsystem including an adsorber; and
a sensor subsystem including a temperature sensor arrangement operable to provide sensed temperature information for two locations, an oxygen sensor arrangement operable to provide sensed oxygen information for two locations; wherein
the processor processes the sensed temperature information and the sensed oxygen information to determine an adsorber temperature and generates fueling commands based upon the adsorber temperature effective to regenerate the adsorber.

11. A system according to claim 10 wherein the processor is a component of an engine control unit.

12. A system according to claim 10 wherein the diesel exhaust aftertreatment subsystem includes a diesel oxidation catalyst and a diesel particulate filter.

13. A system according to claim 10 wherein the temperature sensor arrangement includes a first sensor positioned to sense an inlet temperature of the adsorber and a second sensor positioned to sense an outlet temperature of the adsorber.

14. A system according to claim 10 wherein the oxygen sensor arrangement includes a first sensor positioned to sense adsorber inlet information and a second sensor positioned to sense an adsorber outlet information.

15. A system according to claim 10 wherein the processor calculates first and second fuel injection values to determine the adsorber temperature.

16. A system according to claim 10 wherein the processor processes fresh air flow information to determine the adsorber temperature.

17. A system according to claim 10 wherein the processor is operable in a second mode in which the adsorber temperature is determined based upon a second temperature model.

18. A system according to claim 10 further comprising means for controlling fueling based upon the adsorber temperature.

19. A system according to claim 10 further comprising means for maintaining the adsorber temperature within one or more limits.

20. One or more non-transitory computer readable media configured with computer executable instructions comprising:
   first instructions to determine an adsorber temperature based upon an adsorber temperature value, an adsorber lambda value, a fueling value, a fresh air flow value, and an engine speed value; and
   second instructions to determine an adsorber temperature based upon an alternate logic;
   wherein the alternate logic includes a filter which filters input catalyst trim fuel information.

21. One or more computer readable media according to claim 20 wherein the first instructions to determine an adsorber temperature are further based upon a second adsorber temperature value.

22. One or more computer readable media according to claim 20 wherein the first instructions to determine an adsorber temperature are further based upon a second adsorber lambda value.

23. One or more computer readable media according to claim 20 wherein the first instructions to determine an adsorber temperature are further based upon a second fueling value.

24. One or more computer readable media according to claim 20 wherein the second instructions include a first operator that multiplies a first NOx adsorber inlet temperature variable and a second variable and provides a first output, a second operator that sums the first output and a third variable and provides a second output, a third operator that divides the second output by a fourth variable and provides a third output, and a filter that filters the third output and outputs to a fifth variable which is provided to an output block.

25. One or more computer readable media according to claim 20 wherein the alternate logic processes information an adsorber inlet temperature and an adsorber outlet temperature through two distinct functions.

26. One or more computer readable media according to claim 20 wherein the media are operatively coupled with an ECU.

27. One or more computer readable media according to claim 26 wherein the ECU is operatively coupled with a diesel engine.

28. One or more computer readable media according to claim 27 wherein the diesel engine is operatively coupled with a vehicle.

* * * * *